United States Patent
Hasegawa et al.

(10) Patent No.: US 6,913,842 B2
(45) Date of Patent: Jul. 5, 2005

(54) LIQUID PHASE DIFFUSION WELDED METAL-MADE PRECISION MACHINE COMPONENT AND PRODUCTION METHOD THEREOF

(75) Inventors: Yasushi Hasegawa, Futtsu (JP); Yasuhiro Shinohara, Futtsu (JP); Yutaka Takagi, Hashima (JP)

(73) Assignee: Fukuju Industry Corporation Ltd., Gifu (JP)

( * ) Notice: Subject to any disclaimer, the term of this patent is extended or adjusted under 35 U.S.C. 154(b) by 86 days.

(21) Appl. No.: 10/031,369

(22) PCT Filed: May 18, 2001

(86) PCT No.: PCT/JP01/04196

§ 371 (c)(1),
(2), (4) Date: Jan. 18, 2002

(87) PCT Pub. No.: WO01/87531

PCT Pub. Date: Nov. 22, 2001

(65) Prior Publication Data

US 2003/0044637 A1 Mar. 6, 2003

(30) Foreign Application Priority Data

| May 18, 2000 | (JP) | ................................. 2000-146581 |
| May 18, 2000 | (JP) | ................................. 2000-146853 |
| May 17, 2001 | (JP) | ................................. 2001-148102 |
| May 17, 2001 | (JP) | ................................. 2001-148122 |

(51) Int. Cl.$^7$ .................. B32B 15/04; B32B 15/18; B32B 3/10; B32B 3/20
(52) U.S. Cl. .................. 428/681; 428/662; 428/166; 428/704; 428/685; 428/188
(58) Field of Search .................. 228/262.1, 262.4; 428/679, 678, 34.1, 939, 941, 662, 704, 681, 682, 685, 166, 188; 156/272.2; 148/403

(56) References Cited

U.S. PATENT DOCUMENTS 3,876,447 A * 4/1975 Lally ..................... 228/122.1
5,118,028 A * 6/1992 Ogawa et al. ............ 228/194

(Continued)

FOREIGN PATENT DOCUMENTS

| EP | 0 769 344 A1 | * | 4/1997 |
| EP | 854 002 | | 7/1998 |
| EP | 922 525 | | 6/1999 |
| JP | 2-121782 | | 5/1990 |
| JP | 9-220658 | | 8/1997 |
| JP | 09-220658 | * | 8/1997 |
| JP | 11-285860 | | 10/1999 |

OTHER PUBLICATIONS

Yousetsu Gakkai "Yousetsu Setsugou Binran" Maruzen p. 1157, Sep. 30, 1990.

*Primary Examiner*—Michael La Villa
(74) *Attorney, Agent, or Firm*—Morrison & Foerster LLP

(57) ABSTRACT

A precision machine part is made of a plurality of pieces with a transient liquid phase diffusion bonding alloy provided between the pieces to bond them together. The precision machine part has one or more conveyance passages formed in it, has a longitudinal axis and is configured to permit passage of liquid or gas through the conveyance passage from a pipe line or cylinder. The pieces of the precision machine part are adhered to each other by transient liquid phase bonding with a ribbon of an amorphous bonding alloy. The bonding alloy can contain 1 to 10 atomic % V or can contain 1 to 15 atomic % of B or P or a mixture of B and P and 1 to 10 atomic % V, the balance being Fe and unavoidable impurities, and can exhibit an amount of contraction in a bonding stress loading direction caused by plastic deformation in the bonding process of not more than 5%. The bonding alloy may be an amorphous Ni-based alloy.

2 Claims, 9 Drawing Sheets

U.S. PATENT DOCUMENTS

| | | | |
|---|---|---|---|
| 5,759,300 A | * | 6/1998 | Hasegawa et al. ........... 148/403 |
| 5,919,577 A | * | 7/1999 | Hasegawa et al. ........... 428/606 |
| 5,935,430 A | * | 8/1999 | Craig ....................... 210/198.2 |
| 6,203,754 B1 | * | 3/2001 | Sugiyama .................... 420/442 |
| 6,264,761 B1 | * | 7/2001 | Hasegawa et al. ........... 148/403 |
| 6,378,760 B1 | * | 4/2002 | Shimizu et al. .............. 228/193 |
| 6,405,761 B1 | * | 6/2002 | Shimizu et al. .............. 138/109 |
| 6,514,631 B1 | * | 2/2003 | Yamamoto et al. .......... 428/682 |
| 6,592,154 B2 | * | 7/2003 | Shimizu et al. ........... 285/332.1 |
| 2002/0014514 A1 | * | 2/2002 | Shimizu et al. .............. 228/104 |

\* cited by examiner

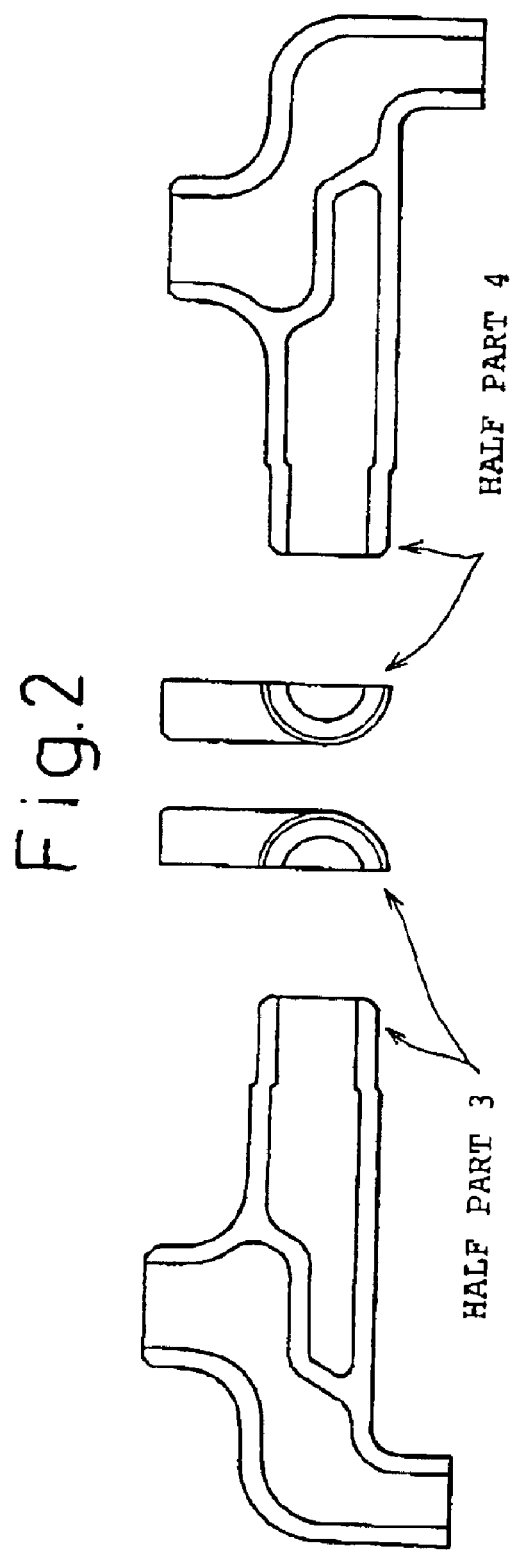

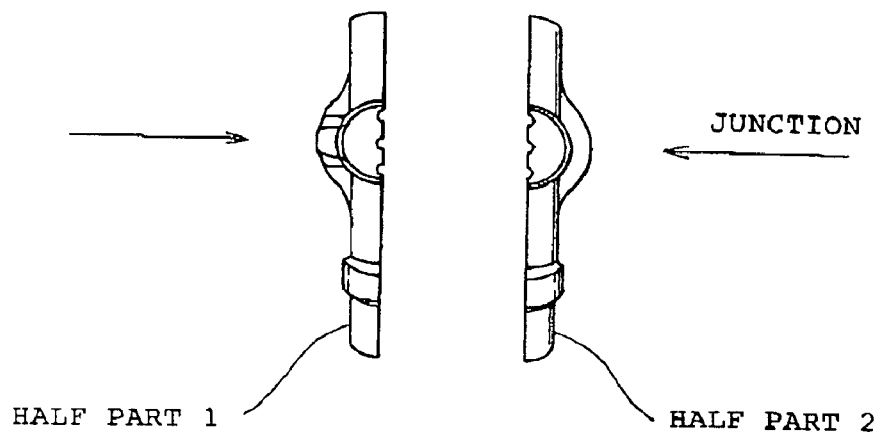
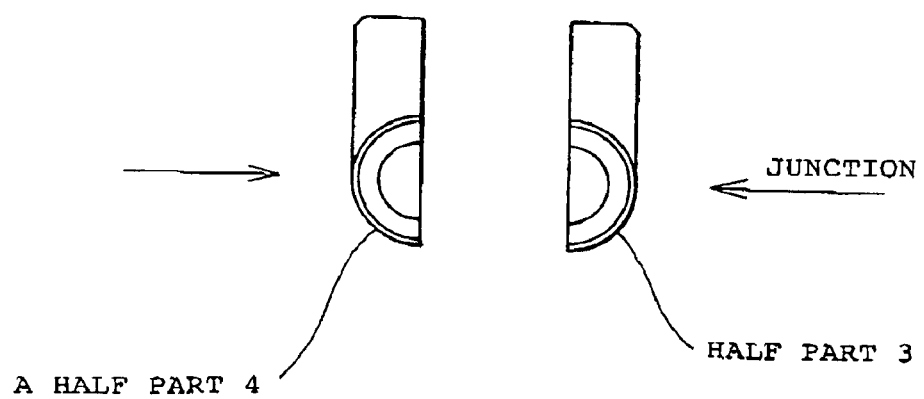

FINISHING

LIQUID PHASE DIFFUSION WELDED METAL-MADE PRECISION MACHINE COMPONENT AND PRODUCTION METHOD THEREOF

BACKGROUND OF THE INVENTION

1. Technical Field of the Invention

The present invention relates to a method of manufacturing machine parts made by means of transient liquid phase diffusion bonding. More particularly, the present invention relates to precision machine parts made of metal by means of transient liquid phase diffusion bonding in the case of assembling machine parts, which have been conventionally manufactured by means of integral molding, having a complicated and precise pipe line inside for conveying a fluid or reducing weight and also having a cylinder inside in which a small sliding member slides.

2. Description of the Background Art

A precision part having a pipe line inside for conveying a fluid and also having a moving path in which a sliding member moves, for example, a moving blade of an internal cooling type turbine, a fuel injection pipe for automobile use, a cylinder head of an internal combustion engine or a faucet used for water supply or used for sewerage has a very complicated profile and inner structure according to the characteristic of the use of the part. Therefore, when the above precision parts are manufactured, it takes a great deal of labor and time and the manufacturing cost is raised. Accordingly, most of the precision parts are manufactured by means of casting in which the lost wax process is used. Alternatively, most of the precision parts are manufactured in such a manner that a steel ingot is subject to forging so that an external form can be made and then the inside is subjected to grinding or drilling so as to form a pipe line or a moving path in which a sliding member is moved. When this machine part is manufactured, it is divided into several parts, and they are individually manufactured, and finally the individual parts are assembled to each other so that they can be formed into a product. In order to finally assemble the individual parts into a product, it is necessary to particularly enhance the machining accuracy of the parts, and at the same time it is necessary to provide a technique for assembling the product in which all parts are assembled to a final profile without leaving any gap between the parts. For the above reasons, in the case of manufacturing a steam turbine or gas turbine, the machining and assembling cost substantially amounts to half of the manufacturing cost.

Accordingly, in many cases, it is possible to manufacture a product at low cost by the conventional manufacturing method in which casting, forging and cutting are used, because know-how of manufacturing the product has been accumulated. However, as long as they follow the prior art described above, when precision machine parts are manufactured, there is a high possibility that the high cost structure, in which the product price is raised by a high manufacturing process cost, is continued in the future. The cost of a precise machine part is mainly composed of the machining cost as described above, and the material cost is relatively low. As a result, compared with the size and profile of a machine part, the price of the part is necessarily high. Actually, parts of an engine are expensive. Accordingly, the cost of the entire apparatus, into which the precise machine parts are incorporated, is remarkably raised, which could hinder the spread of an otherwise excellent technique.

In order to solve the above problems of the high manufacturing cost structure, it is necessary to reduce the manufacturing process cost, and further it is necessary to reduce personnel expenses. However, in this mature social environment, it is difficult to reduce personnel expenses. On the contrary, there is a tendency for personnel expenses to rise, as is well known. Accordingly, it is desirable to develop a technique by which the manufacturing cost of precise machine parts, which can be made by an otherwise excellent technique, is reduced so that the precise machine parts can be industrially supplied at low cost. In order to accomplish the above object, it is necessary to replace the manufacturing technique of the prior art with a new manufacturing process which is entirely different from the conventional manufacturing method.

According to the prior art in which a forged steel ingot or a cast steel ingot is subjected to cutting or drilling so as to manufacture a machine part, it is necessary for an inside pipe line to be located on a straight line which can be formed by direct drilling conducted from the outside; that is, it is impossible to machine a pile line which cannot be formed by direct drilling conducted from the outside and it is also impossible to machine a closed system which is not open to the outside. However, the prior art is not simply limited to a pipe line located on a straight line which is open to the outside, but it is impossible to manufacture a precise machine part, which has a pipe line formed by an irregular radius of curvature, a closed path filled with a fluid or a closed pipe line necessary for reducing the weight, by machining a steel ingot. The above pipe line, incapable of being manufactured by machining from the outside after the completion of manufacturing a steel ingot, cannot be manufactured by the prior art. Such a machine part therefore cannot be designed, and further it is impossible to conceive of the machine part.

SUMMARY OF THE INVENTION

It is an object of the present invention to provide a new assembling manufacturing technique for precise machine parts, which is different from the prior art, wherein the assembling manufacturing technique is used when precise machine parts are manufactured which have a pipe line for conveying a fluid, a pipe line for reducing weight or a pipe line in which a sliding member slides, and conventionally the machine parts are manufactured by means of machining the outside or inside of a steel ingot made by integral molding. More particularly, the present invention provides an alloy foil used for transient liquid phase diffusion bonding when assembling of precise machine parts is conducted by means of transient liquid phase diffusion bonding, and also the present invention provides the condition of transient liquid phase diffusion bonding.

Transient liquid phase diffusion bonding will now be described. Alloys containing elements which is the melting points are lower than the melting point of a material to be bonded can be used. Preferably, 50% or more of the crystal structure is substantially amorphous is used. These are capable of forming a joint through an isothermal solidification process of diffusion rate-determination, for example, alloys of "B or P" and "Ni or Fe" is interposed between faces to be bonded, that is, in the bevel to be joined. Then, the joint is heated to a temperature not lower than the melting point of the low melting point alloy into which the joint is inserted, and the joint is kept at the temperature, so that the joint can be formed in the isothermal solidification process. The aforementioned technique is different from the conventional welding technique, being characterized in that welding residual stress seldom exists; and excess metal, is not generated in the welding process, so that a smooth and precise joint can be formed. According to the above technique, the joint is made by surface bonding. Therefore, the bonding time is constant irrespective of the area of a bonding face, and bonding can be completed in a relatively short period of time, in contrast to the conventional welding process. Accordingly, as long as the bevel can be kept at a temperature not lower than the melting point of the low melting point metal for a predetermined period of time, it is possible to bond a face to a face irrespective of the profile of a bevel.

In Japanese Patent Publication Nos. 1891618, 1891619 and 1837572, the present inventors have already disclosed the technique of transient liquid phase diffusion bonding which can be realized in a conventional non-oxidizing atmosphere by utilizing the above characteristics of transient liquid phase diffusion bonding and also the present inventors have already disclosed a new alloy foil used for transient liquid phase diffusion bonding which can be applied in an oxidizing atmosphere.

According to the present invention, the objective machine part is obtained as follows. In the case where a precise machine part, having a pipe line for conveying a fluid, a pipe line for reducing weight or a pipe line in which a sliding member slides, is manufactured from a steel ingot which has been made by integral molding, the steel ingot is divided into a plurality of pieces on faces including the pipe line, and foil, powder, plating or alloy, the profile of which follows a face, is made to intervene on the divided faces, and a bonding face or one portion of the part or the entire part including the bonding face is heated to a temperature not lower than the melting point of the transient liquid phase diffusion bonding alloy and kept at the temperature for a predetermined period of time, so that the machine part can be assembled and bonded by transient liquid phase diffusion bonding and the final profile can be ensured.

When transient liquid phase diffusion bonding is applied for assembling a machine part as described above, the important aspect is the specification characteristic of the machine part which has been assembled by bonding. In order to enhance the effect of industrial mass production, it is preferable that the manufacturing process be simplified to the utmost and that the manufacturing cost is low. A load caused by bonding stress acting on the bonding face, which is indispensable to transient liquid phase diffusion bonding when a plurality of pieces are assembled into a final shape by transient liquid phase diffusion bonding, must be a value at which a change in the profile of the bonding material to be bonded is as small as possible and correction of the profile of the assembled part is as small as possible.

The present inventors made investigations into the manufacture of machine parts in which transient liquid phase diffusion bonding is used. As a result of their investigations, the present inventors experimentally ensured the following facts. The condition in which it is not necessary for the shape of an assembled machine part to be corrected is one in which the of contraction in the direction of a load generated by bonding stress according to plastic deformation in the process of bonding is not more than 5%. Also, the present inventors experimentally ensured. That in order to reduce the manufacturing process cost, it is not desirable to restrict the bonding atmosphere. Even when the oxygen concentration in the atmosphere is not less than 0.01 mass %, it is preferable to use an alloy foil capable of realizing transient liquid phase diffusion bonding. A summary of the present invention is given below.

(1) A precision machine part made of transient liquid phase diffusion bonding metal having a conveyance passage in which liquid or gas of a pipe line or cylinder passes, the precision machine part being divided into a plurality of pieces on an arbitrary face in the axial direction of the conveyance passage, the pieces being adhered to each other by transient liquid phase diffusion bonding.

(2) A method of manufacturing a precision machine part made of transient liquid phase diffusion bonding metal, comprising the steps of dividing a precision machine part into a plurality of pieces on an arbitrary face in the axial direction of a conveyance passage in which liquid or gas of a pipe line or cylinder passes; and adhering the pieces to each other, each piece having an alloy used for bonding which contains V in 1 to 10 atomic % on the divided face, by transient liquid phase diffusion bonding in an oxidizing atmosphere containing oxygen in 0.01 mass % or more.

(3) A method of manufacturing a precision machine part made of transient liquid phase diffusion bonding metal according to item (2), wherein the divided face is a single face, continuous multiple faces, divided multiple faces, a continuous curved face or a divided curved face including a conveyance passage in which liquid or gas in a pipe line or cylinder passes.

(4) A method of manufacturing a machine part in which transient liquid phase diffusion bonding is conducted under the condition that the temperature is 900° to 1300° C., the surface pressure is 30 MPa at the maximum and the stress loading time is not less than 30 seconds, comprising the step of applying transient liquid phase diffusion bonding alloy containing one of B and P or both of B and P in 1 to 15 atomic % in total, also containing V in 1 to 10 atomic %, the balance being Fe and unavoidable impurities, the transient liquid phase diffusion bonding alloy being capable of bonding in an oxidized atmosphere, the crystal structure of the transient liquid phase diffusion bonding alloy being substantially amorphous, wherein the amount of contraction in the bonding stress loading direction caused by plastic deformation in the process of bonding is not more than 5% at all positions on a bevel face of the material to be bonded.

(5) A method of manufacturing a machine part in which the transient liquid phase diffusion bonding described in item (4) is used, wherein the transient liquid phase diffusion bonding alloy is an amorphous alloy of Ni base.

(6) A method of manufacturing a machine part according to item (4) or (5), in which transient liquid phase diffusion bonding is used, wherein the method is applied to a part the surface roughness (Rmax) of the bevel surface of the material to be bonded of which is not more than 100 μm.

(7) A method of manufacturing a machine part according to one of items (4) to (6), in which transient liquid phase diffusion bonding is used, wherein a substantially amorphous bonding alloy is used, the mechanical characteristic or corrosion resistance of the bonding alloy is respectively made suitable for the chemical composition of the material to be bonded, and the bonding alloy contains one or two and more of the following elements by atomic % so as to enhance the joint characteristic.

C: 0.1 to 10.0%
Si: 0.1 to 5.0%
Mn: 0.5 to 5.0%
Cr: 0.1 to 20.0%
Mo: 0.1 to 5.0%
Nb: 0.01 to 5.0%
Ti: 0.01 to 5.0%

(8) A method of manufacturing a precision machine part made of transient liquid phase diffusion bonding metal, comprising the steps of dividing a precision machine part made of metal having a conveyance passage, in which liquid or gas in a pipe line or cylinder passes, into a plurality of pieces on an arbitrary face in the axial direction of the conveyance passage; realizing isothermal solidification by quick heating the machine part by means of high frequency induction heating in an oxidizing atmosphere, the content of oxygen of which is not less than 0.01 mass %, in a constant temperature furnace; exerting bonding stress by a load or Instron type tensile/compression device in the constant temperature furnace; holding at a constant temperature the bonding temperature for homogenization the joint structure according to atomic diffusion in the case of transient liquid phase diffusion bonding in the constant temperature furnace in which quick heating including high frequency induction heating is conducted; and conducting cooling rate control after completion of isothermal solidification by spraying a cooling medium such as water so as to ensure the mechanical characteristic of a portion or the entire machine part.

In the present invention, when an alloy for bonding, condition for bonding and accuracy of a bevel face of material to be bonded for assembling and bonding a machine part are specified as described above, it is possible to provide a method of manufacturing a machine part, the manufacturing process cost of which is low.

BRIEF DESCRIPTION OF THE DRAWINGS

FIG. 1 is a view showing a fluid injection nozzle.

FIG. 2 is a view showing profiles of pieces of a machine part, which has been manufactured by integral molding, which is divided into pieces on a face passing through a pipe line formed inside the machine part. In particular, FIG. 2 is a view showing profiles of pieces of a divided faucet in a fluid conveyance passage.

FIG. 3 is a view showing a model of a butted state in the case of assembling a fluid injection nozzle by transient liquid phase diffusion bonding, wherein FIG. 3 is a view taken in a direction perpendicular to a bonding face.

FIG. 4 is a view showing a model of a butted state in the case of assembling a faucet by transient liquid phase diffusion bonding, wherein FIG. 4 is a view taken in a direction perpendicular to a bonding face.

FIG. 5 is a view showing a portion of a fluid injection nozzle to be machined after the fluid injection nozzle has been assembled by transient liquid phase diffusion bonding, wherein FIG. 5 shows the inside and outside of the fluid injection.

FIG. 8 is a view showing a profile of divided pieces of a machine part which has been divided into two pieces on a face including pipe lines, wherein FIG. 8 is taken in a direction of a bonding cross-section and also taken in a direction perpendicular to a bonding face.

THE MOST PREFERRED EMBODIMENT

Figure 1:
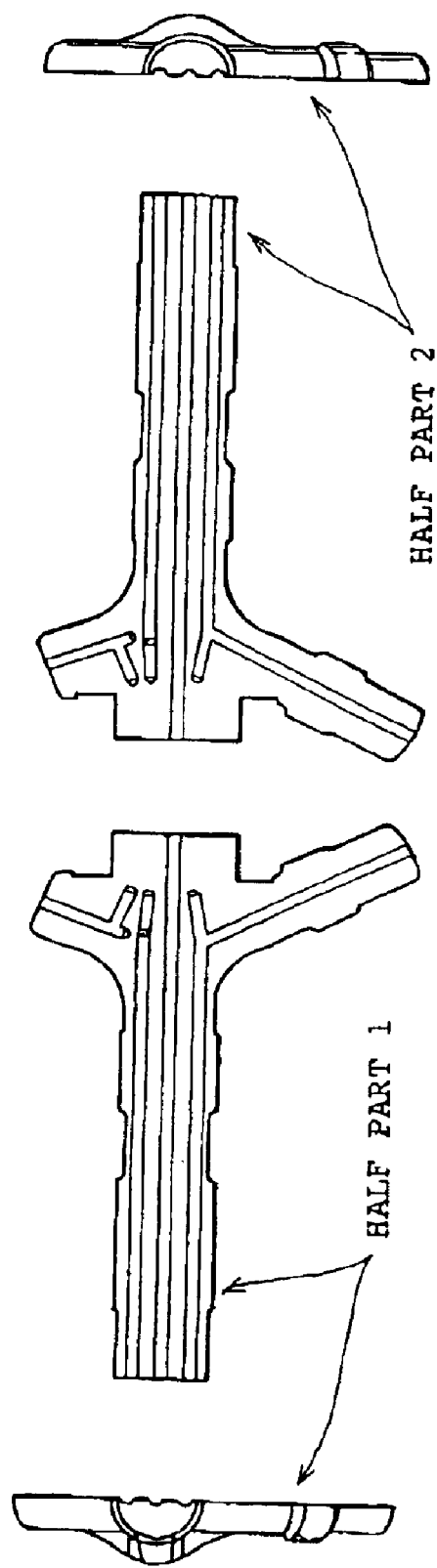
FIG. 1 is a view showing profiles of pieces of a machine part, which has been manufactured by integral molding, which is divided into pieces on a face passing through a pipe line formed inside the machine part. In particular.

When the present invention is executed, the material of an objective machine part is not particularly limited. It is possible to apply the technique of the present invention to all metallic materials to which it is considered to be able to apply transient liquid phase diffusion bonding. For example, even in the case of common carbon steel, high carbon steel or low carbon steel, the common welding of which is considered to be difficult, it is possible to realize a bonding joint by transient liquid phase diffusion bonding. Further, even in the case of stainless steel containing Cr or Ni in various ratios, highly corrosion-resistant alloy steel, Ni alloy, the base material of which is Ni, other alloys, and Al, Ti and Zn, which are non ferrous metals, and other practically used metals can be bonded by transient liquid phase diffusion bonding when bonding alloys suitable for those metals are used.

In the present invention, a precision machine part, having a pipe line for conveying a fluid, a pipe line for reducing weight or a pipe line in which a sliding member slides, which has been conventionally manufactured by means of integral molding, is manufactured in an inexpensive manufacturing process such as press forming, rolling, grinding and polishing for each piece when the machine part is divided into a plurality of pieces on a face including the pipe line and the thus divided pieces are assembled and bonded by transient liquid phase diffusion bonding by using a transient liquid phase diffusion bonding alloy.

In this case, it is necessary for the machine part to be divided on a face on which an internal pipe line passes. By virtue of the foregoing, each piece can be manufactured by an inexpensive and simple method such as press forming. In this case, the machine part may be divided into pieces, the number of which may be two or more. As long as the cost of the manufacturing process does not rise higher than that of the conventional manufacturing process as a result of simplifying the manufacture and increasing the number of the manufacturing processes, the number of the pieces into which the machine part is divided may be appropriately determined. The divided face may be a plane, a curved face, or continuous or discontinuous multiple faces or curved faces. A profile of the divided face may be appropriately determined so that each piece can be easily manufactured when the machine part is divided into a plurality of pieces. In this connection, a profile formed inside the final machine part may be one continuous passage or a plurality of independent passages, and a profile of the pipe line itself may be arbitrarily determined, i.e. as long as faces to be bonded in the case of assembling correspond to each other, the pipe line is not particularly limited to a specific profile. It is possible to assemble the machine part regardless of whether the pipe line is open or not open to the external surface. In this connection, the characteristic of the bonding section changes variously according to a combination of the material to be bonded with the transient liquid phase diffusion bonding alloy.

In the present invention, the characteristic of the bonding face can be arbitrarily changed according to the specification of the machine part to which the present invention is applied. In other words, the characteristic of the joint is not particularly limited. The joint efficiency is not necessarily 1, and the structure is not necessarily completely homogeneous. Of course, from the viewpoint of the characteristic of the machine part, it is preferable that the joint efficiency be 1 and the structure be completely homogenous. However, the joint efficiency and the structure may be determined according to the manufacturing cost of the machine part. It is possible to conduct various heat treatment, chemical treatment or machining on the machine part after completion of assembling. For example, in the case of steel, heat treatment such as quenching, tempering, normalizing or annealing may be singly or complexly conducted or repeated depending upon the case, which is effective for enhancing the characteristic of the machine part and does not impair the effect of the present invention. It is effective to conduct cementation, nitriding, plating, surface treatment such as coating, powder blasting or shot blasting for enhancing the characteristic of the machine parts.

In the case of assembling by transient liquid phase diffusion bonding, the conditions of pressurizing and heating the bonding face, which are necessary for realizing transient liquid phase diffusion bonding, may be determined according to the types of the material to be bonded and the transient liquid phase diffusion bonding alloy. In this case, the method and the means for pressurizing and the method and the means for heating are not particularly limited. However, in order to realize quick heating, it is necessary to adopt high frequency induction heating. In order to control the bonding stress uniformly and accurately, it is preferable to use a bonding device of the Instron type having a compressive stress loading function. The bonding atmosphere is not particularly limited. It is possible to apply transient liquid phase diffusion bonding which is conducted in a common non-oxidizing atmosphere. In the case where a transient liquid phase diffusion bonding alloy containing V by 1 to 10 atomic % is used, it is possible to conduct bonding in an atmosphere the oxygen concentration of which is not less than 0.01%, i.e. in which it is not necessary to use a non-oxidizing atmosphere. Therefore, the manufacturing cost can be greatly reduced and the manufacturing process can be shortened. The reason the manufacturing cost can be greatly reduced and the manufacturing process shortened is that the bonding alloy containing V by 1 to 10 atomic % has a function by which transient liquid phase diffusion bonding can be conducted even in an atmosphere containing oxygen of 0.01% or more. Therefore, it is effective in enabling a reduction of the manufacturing cost of the machine part and shortening the manufacturing process of the machine part, which are the object of the present invention. In addition to that, in order to enhance mass-production, it is preferable that a heat supply source for quick heating and a heat supply source for keeping the machine part at a constant temperature be provided separately from each other. For example, it is preferable that heating until completion of isothermal solidification be conducted in a high frequency induction heating furnace and that the homogenization diffusion treatment for ensuring the characteristic according to the specification of the machine part be successively conducted in a large electric furnace. Further, in order to homogenize the metallic structure of the bonding section so as to enhance the characteristic of the machine part, it is necessary to control cooling after completion of bonding. Especially when the rate of cooling after completion of bonding is controlled by blowing a cooling medium such as gas, oil or water or by dipping the joint itself in a cooling medium, it is possible to obtain an objective metallic structure.

In the present invention, in the case of assembling the objective machine part, the profile of a bonding alloy is not particularly restricted. Transient liquid phase diffusion bonding can be adopted to bonding of assembling parts. It is possible to apply foil, powder or plating, which will enhance the effect of the present invention. However, the transient liquid phase diffusion bonding alloy must contain one of B and P or both of B and P in 1 to 15 atomic % in total and also contain V in 1 to 10%, the balance being Ni or Fe and unavoidable impurities, the transient liquid phase diffusion bonding alloy being capable of bonding in an oxidized atmosphere, the crystal structure of the transient liquid phase diffusion bonding alloy being substantially amorphous. As a form of transient liquid phase diffusion bonding alloy, it is possible to supply it in the form of foil, powder or plating to a bonding interface in the case of assembling bonding. Concerning the amorphous alloy composition to realize transient liquid phase diffusion bonding, except for the above alloy composition, it is possible to use an alloy disclosed in U.S. Pat. No. 4,144,058. It is also possible to use a transient liquid phase diffusion bonding alloy containing P, B and C as diffusion atoms disclosed in Japanese Unexamined Patent Publication No. 49-91014. When an excessively high stress is exerted on a bonding face of a precision machine part made of metal in the case where the precision machine part is assembled by means of transient liquid phase diffusion bonding in which it is necessary to apply pressure to the bonding face, there is a possibility that the desired final profile of the machine part cannot be obtained. In order to avoid the occurrence of such a problem, it is necessary to keep the amount of contraction in the direction of a bonding stress load, which is caused by plastic deformation in the case of bonding, to not more than 5% in all portions on the bevel face of the material to be bonded.

When the thickness of a layer of bonding alloy which is interposed between the bonding faces is relatively small in the case where the machine part is assembled by means of transient liquid phase diffusion bonding, there is a possibility that some portions of the bonding faces will not be bonded because of irregularities on the surface of the material to be bonded, i.e. there is a possibility that a bonding defect will occur when there is an upper limit in the bonding stress in transient liquid phase diffusion bonding in which the bonding faces must be in close contact with each other. Accordingly, in the case of assembling bonding, it is necessary to reduce irregularities on the bonding face of the material to be bonded, and the surface roughness (Rmax value) must be of a value not more than 100 μm.

Figure 7:
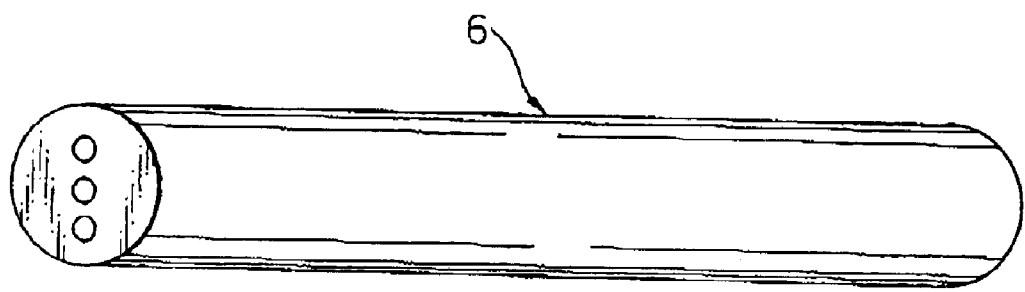
FIG. 7 is a perspective view showing a cylindrical machine part having three pipe lines inside.
Figure 8:
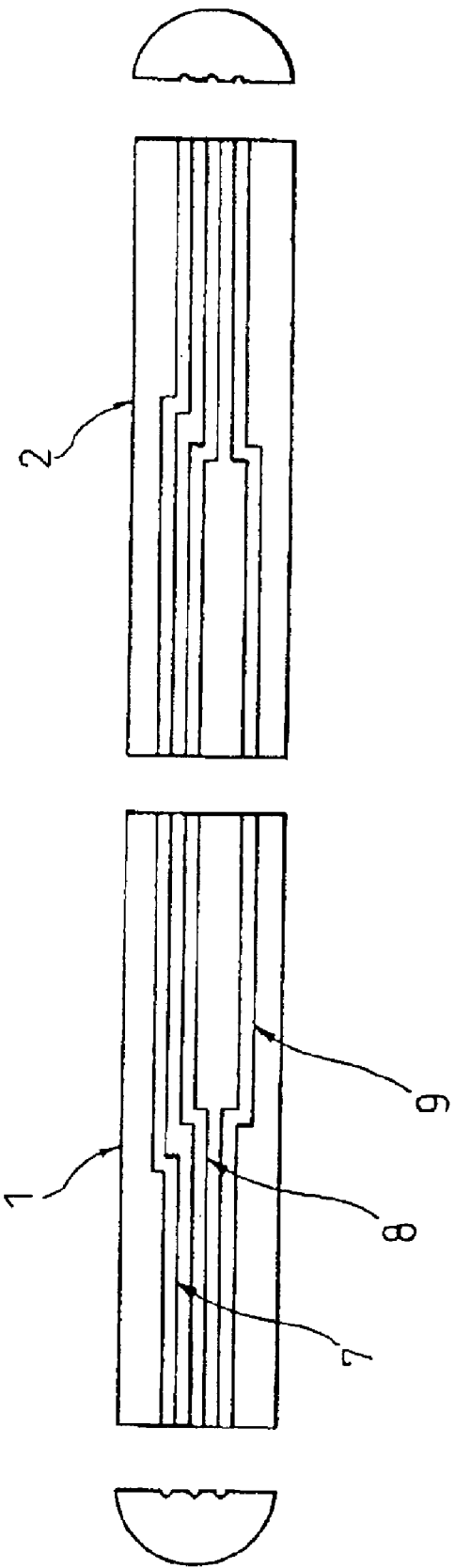

The above restriction values placed on the material to be bonded were determined by the following experiments. An alloy for transient liquid phase diffusion bonding, the essential composition of which is based on the chemical composition of the present invention, is shown in the form of a foil, powder or plating in FIG. 7. A fluid conveyance body, in which three pipe lines are formed, is divided into two pieces by a face on which the pipe lines pass, and the thus divided faces are bonding faces, and the alloy for transient liquid phase diffusion bonding is interposed between the bonding faces. In this connection, the half part shown in FIG. 7 was manufactured by press forming. FIG. 8 is a view showing circumstances of the bonding faces and the pipe lines. It is impossible to form such pipe lines by drilling which is conducted from the outside on a cylinder manufactured by integral molding.

Figure 9:
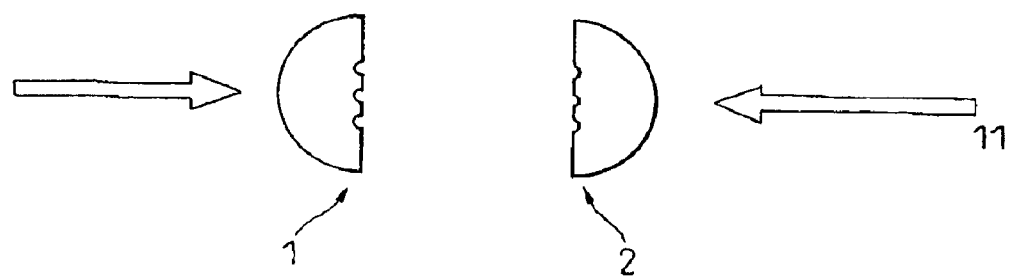
FIG. 9 is a view showing a butted state of a half part in the case of assembling and bonding by transient liquid phase diffusion bonding, and also showing the direction of a bonding stress load.
Figure 10:
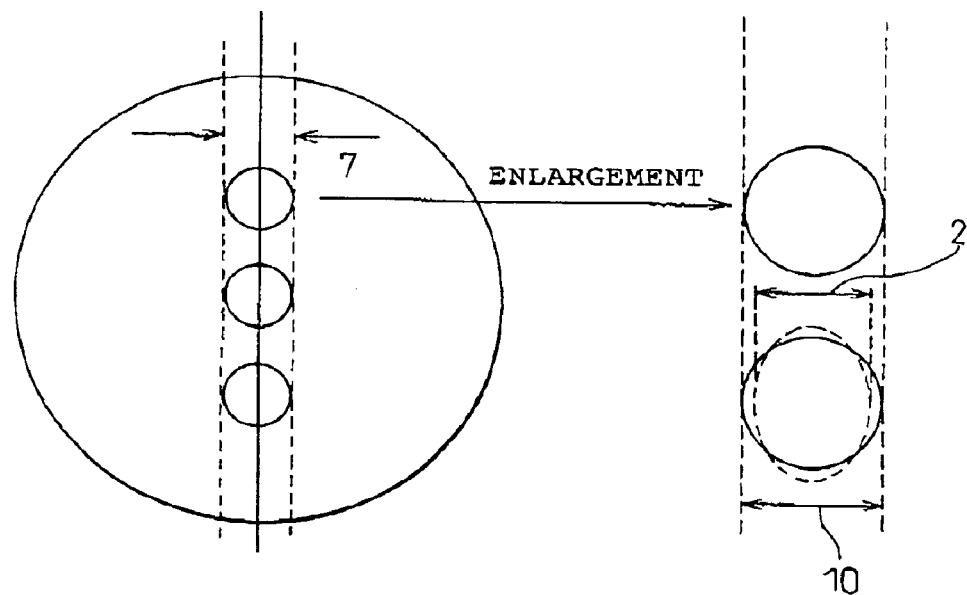
FIG. 10 is an enlarged view showing a pipe line portion in the case of butting bonding faces to each other as shown in FIG. 9.

As shown by a model in FIG. 9 which is a view of the half part taken in a direction perpendicular to the dividing face, bonding stress was exerted on the bonding face in the direction perpendicular to the bonding face while the bonding stress was changed variously, and the entire part was heated to the transient liquid phase diffusion bonding temperature and kept at the temperature for a predetermined period of time so as to realize transient liquid phase diffusion bonding. In this way, the machine part was manufactured. At this time, in order to evaluate the grade of deformation in the neighborhood of the pipe lines, changes in the diameters of the pipe lines were measured before and after the bonding. Table 1 shows changes in the bonding stress and the diameter of the pipe line in the case where mild steel obtained on the market was used which contained carbon by 0.14%, the mechanical strength of which was 400 MPa. More specifically, as shown in FIG. 10, values of [(pipe line diameter before bonding)−(pipe line diameter 10 in compression direction after bonding)/(pipe line diameter 7 before bonding)] are shown by percentage together with the values of bonding stress. In this case, the bonding temperature was 1200° C., and the bonding time was 300 seconds, Further, Table 1 shows whether or not seizing occurred when a sliding member passed inside the pipe line together with lubricant in the case where the pipe line had been deformed by bonding stress after completion of bonding. More particularly, Table 1 shows whether or not the pipe line normally functioned as a cylinder part. At the same time, Table 1 shows whether or not the fluid temperature exceeded the restriction value by a local pressure increase caused by deformation of the pipe line when a fluid passed in the pipe line at a high flow velocity.

TABLE 1

| Mark | Quantity of compression in bonding stress loading direction (%)* | Bonding stress (MPa) | Occurrence of seizing in the case of piston sliding | Exceeding of upper limit of increase in conveyance fluid temperature |
|---|---|---|---|---|
| 1 | 1.2 | 1 | No | No |
| 2 | 2.2 | 3 | No | No |
| 3 | 2.8 | 5 | No | No |
| 4 | 3.0 | 10 | No | No |
| 5 | 3.9 | 15 | No | No |
| 6 | 4.8 | 20 | No | No |
| 7 | 5.0 | 30 | No | No |
| 8 | 6.7 | 40 | Yes | Yes |
| 9 | 9.9 | 50 | Yes | Yes |
| 10 | 23.5 | 70 | Yes | Yes |

*Quantity of compression (%) in bonding stress loading direction = [(pipe line diameter before bonding) − (pipe line diameter in compression direction after bonding)]/(pipe line diameter before bonding)

As can be seen from Table 1, seizing of the piston in the cylinder occurred in the case where the amount of contraction of the material in the bonding stress loading direction, i.e. the ratio of change in the pipe line diameter exceeded 5%. Also, as can be seen from Table 1, an increase in the temperature of a conveyance fluid (water for industrial use in the present experiment) exceeded the restriction value (35° C.) under the same condition. Further, the following were confirmed. Although malfunctioning of the machine part depended somewhat upon the bonding stress when the type of the material to be bonded, the profile of the piston, the ingredient of the lubricant, the ingredient of the conveyance fluid and the conveyance speed of the fluid were changed variously, as long as the bonding temperature and bonding stress were changed in a range in which consideration was given to the manufacturing cost, malfunctioning occurred under substantially the same condition. More specifically, the following were found. It is necessary to restrict deformation of the pipe line inside the machine part when a bonding stress load is exerted, i.e. it is necessary to restrict the amount of contraction in the bonding stress loading direction to be not more than 5%.

As can be clearly seen from Table 1, in order to restrict the amount of contraction in the bonding stress loading direction to be not more than 5%, it is necessary to restrict the bonding stress to be not more than 30 MPa. This relation between the stress and the amount of contraction is caused by thermal plastic deformation generated for 300 seconds at a bonding temperature of 1200° C. Therefore, the higher the stress, the greater the deformation is increased. Accordingly, the loading stress is restricted. It can be also considered that this quantity of deformation is a function of the bonding time. However, a clear dependency upon the bonding time was not observed in the period of time of the experiment and in the scope of the embodiment described later. Therefore, the upper limit of the load stress was determined according to the results shown on Table 1.

Figure 5:
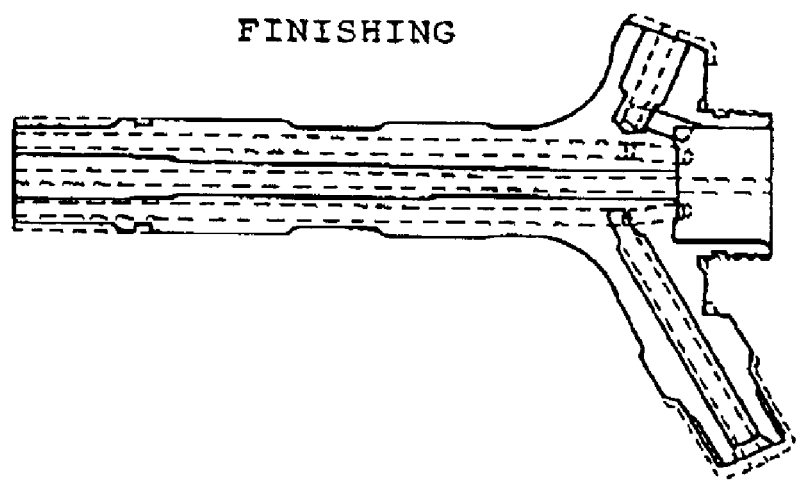
Figure 11:
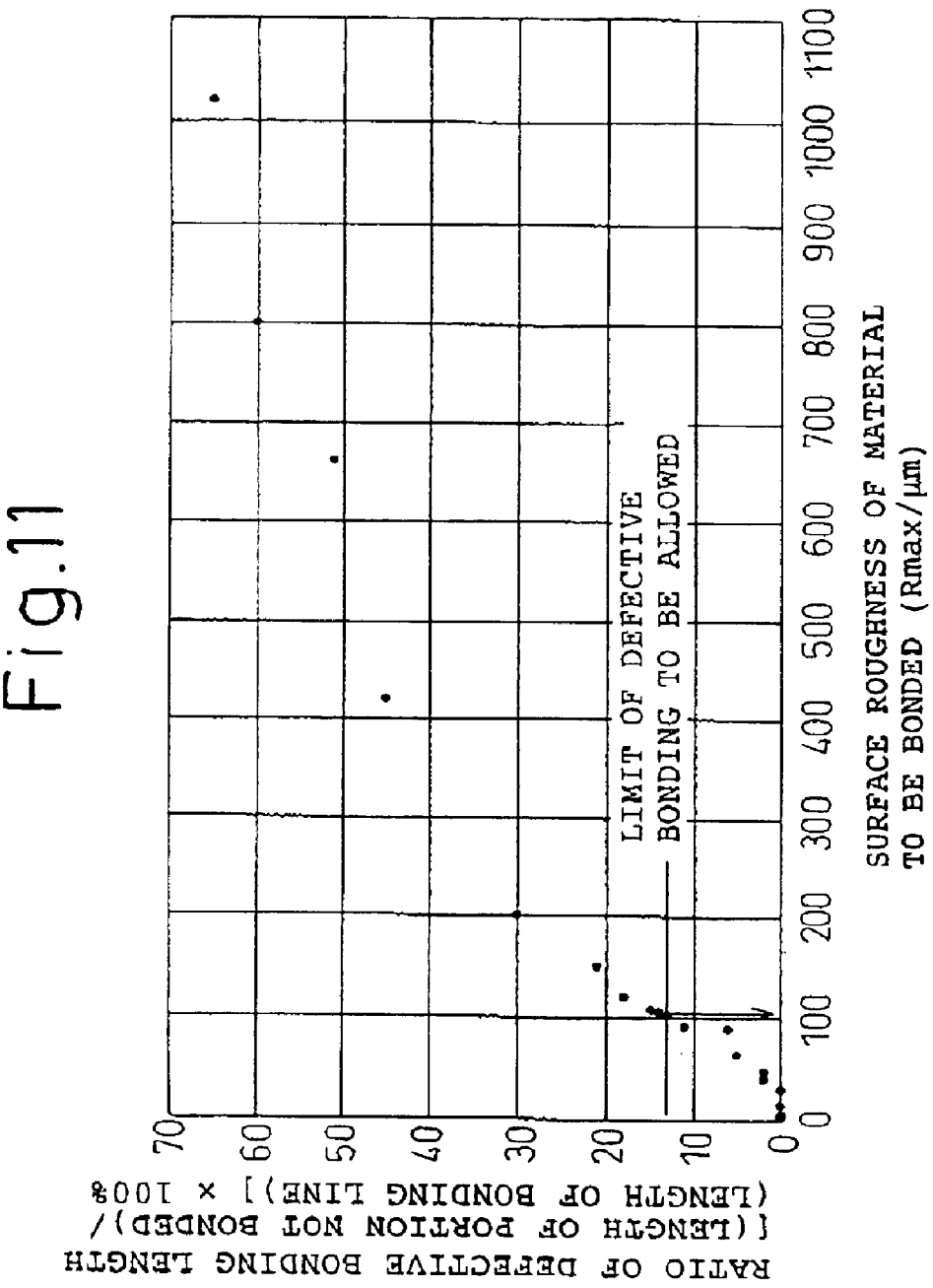
FIG. 11 is a graph showing a relation between a ratio of bonding defect length and bonding face roughness before conducting bonding.

Further, in the case where the bonding stress of 10 MPa was exerted under a bonding condition of 1200° C. and 300 seconds, roughness of the bonding face of the material to be bonded was adjusted by machining. In the material, the Rmax value of which was different, the quality of the bonding section is shown in FIG. 5 by a ratio of the bonding line length of a portion, which has not been bonded yet, which was found by optical microscopic examination conducted on the cross-section of the bonding face. This ratio of the bonding line length of a portion, which has not been bonded yet, will be referred to as the "Ratio of defective bonding length", hereinafter. According to the preliminary examination, it was found that when the ratio of defective bonding length is not more than 12, and the mechanical strength of the joint is not less than 70% of the base metal. Further, according to market research and the reliability evaluation test, it was found that a joint cannot be used reliably for the industrial machine parts if the joint efficiency is lower than 70%. Accordingly, in this case, the threshold value is set at the joint efficiency 70%, and the reference of judgment of the machine part assembling joint was determined in such a manner that the ratio of the defective bonding length was 12. As can be seen from FIG. 11, when the value of Rmax exceeded 100, the ratio of the defective bonding length exceeded the threshold value of 12. This relation is not strongly correlated to the type of material to be bonded, the bonding temperature and the bonding time, i.e. this relation existed almost in all conditions. Due to the foregoing, the surface roughness of the bonding face of material to be bonded in the machine part assembling bonding was restricted 100 μm at the maximum.

On the other hand, concerning the bonding alloy used for transient liquid phase diffusion bonding, a Ni-base bonding alloy or an Fe-base bonding alloy has been developed and put into practical use. However, as long as the bonding alloy is limited to industrial use, the composition of the bonding alloy is seldom proposed while consideration is being given to the mechanical or chemical uniformity of the bonding section. Since the width of the bonding metal after the completion of bonding in the transient liquid phase diffusion bonding joint is not more than 50 μm, which is very narrow, i.e. since the width of a portion corresponding to the welded metal in welding is not more than 50 μm, which is very narrow, and since the mechanical characteristic of the bonding metal seldom affects their use because of the restriction effect of the material in the periphery, and since the area of the bonding metal exposed to the environment is small, discontinuity of the chemical characteristic can be neglected in many cases. However, the size of the precision machine part, which is an objective matter of the present invention, is small. Therefore, even when a discontinuous structure the length of which is several ten μm exists in the joint, the performance of the material to be bonded will be affected when the joint is used. Accordingly, in the present invention, from the viewpoint of maintaining the mechanical or chemical characteristic, the chemical composition of the transient liquid phase diffusion bonding alloy is restricted so that it is the same composition as that of the welding material.

The bonding alloy contains one or two and more of the following elements by atomic %, such as, C: 0.1 to 10.0%, Si: 0.1 to 5.0%, Mn: 0.5 to 5.0%, Cr: 0.1 to 20.0%, Mo: 0.1 to 5.0%, Nb: 0.01 to 5.0%, and Ti: 0.01 to 5.0%.

At the same time, in order to make the crystal structure of this alloy substantially amorphous and in order to make it possible to conduct transient liquid phase diffusion bonding, the transient liquid phase diffusion bonding alloy contains one of B and P or both of B and P in 1 to 15 atomic % in total, and also contains V in 1 to 10%, the balance being Fe and unavoidable impurities. Concerning the addition of V in some cases, V is added for making the chemical composition of the material to be bonded uniform. However, the primary object of adding V is to make it possible to conduct bonding in an oxidizing atmosphere. The above restriction in chemical composition is for the following reasons.

C increases the mechanical strength of metal through forming a solid solution, strengthening crystallization and accomplishing a phase transformation. In order to exhibit the effect of C, it is necessary for the metal to contain C in 0.1%. When the metal contains C in a value greater than 10%, the metal may be embrittled. Therefore, the range of C content was determined to be 0.1 to 10%.

Si is necessary element for enhancing the ratio of amorphousness of a bonding alloy, and further Si can facilitate formation of a solid solution in a grain of the metal. These effects is exhibited when the content of Si is more than 0.1%. When the content of Si exceeds 5%, Si remains in the bonding metal in the form of silicon oxide. Therefore, the content of Si was determined to be in the range 0.1 to 5.0%.

Mn increases the mechanical strength of metal through forming a solid solution and accomplishing a phase transformation. In order to achieve the effect of Mn, it is necessary for the metal to contain Mn in 0.5% at least. When the metal contains Mn in a value greater than 5.0%, the metal may be embrittled. Therefore, the range of Mn content was determined to be 0.5 to 5.0%.

Cr facilitates non-diffusion transformation and enhances the mechanical strength in the case of a phase transformation. At the same time, Cr forms a protective coating on the surface, so that the corrosion-resistance of the bonding metal is enhanced. When the content of Cr is lower than 0.1%, no effect is achieved. When the content of Cr exceeds 20%, it is difficult for the bonding metal to become amorphous. Therefore, the content of Cr was determined in the range from 0.1 to 20%.

Mo is an element for strengthening the formation of a solid solution so that the mechanical strength can be enhanced at high temperature. Mo is indispensable for bonding heat-resistant metal. When the content of Mo is not more than 0.1%, no effect is achieved. When the content of Mo exceeds 5.0%, grains of oxide, the sizes of which are coarsened, are created, and further intermetallic compound is created. Therefore, the bonding metal is embrittled. Thus, the content of Mo was determined to be in the range from 0.1 to 5.0%.

Both Nb and Ti are elements for forming carbide and nitride. Therefore, at high temperatures, Nb and Ti prevent the crystal grains of a bonding alloy from coarsening so that the toughness can be enhanced. At room temperature or low temperature, Nb and Ti strengthen crystallization so as to enhance the mechanical strength of the bonding metal. When the contents of Nb and Ti are respectively lower than 0.05%, no effect is achieved. When the contents of Nb and Ti respectively exceed 5.0%, grains of crystallization coarsen, so that the bonding metal is embrittled. Therefore, the content was determined to be in the range from 0.05 to 5.0%.

EXAMPLE 1

Figure 6:
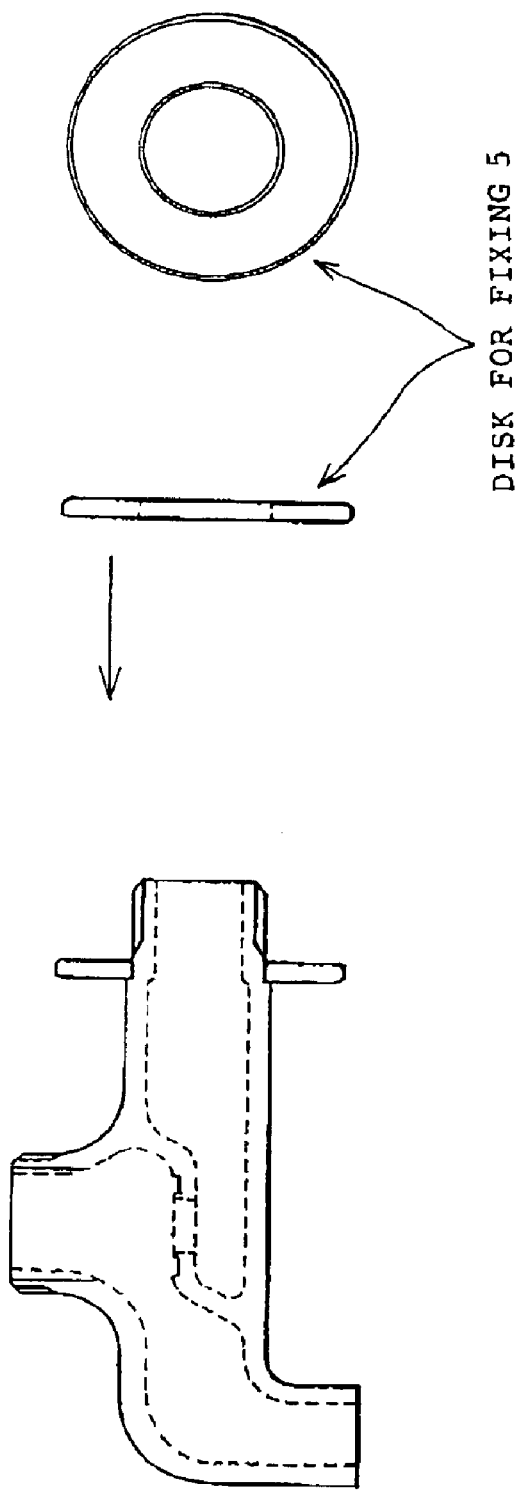
FIG. 6 is a view showing a state of engagement of a faucet, which has been assembled by transient liquid phase diffusion bonding, with a disk part which has been machined separately from the faucet.

The half machine parts shown in FIGS. 1 and 2 were butted to each other as shown in FIGS. 3 and 4. Between the butted faces, a piece of alloy foil for transient liquid phase diffusion bonding composed of more than 50% amorphous, which was formed into the same profile of the butted face by cutting or machining, the thickness of which was 30 μm, was interposed. While a sufficiently heavy load for transient liquid phase diffusion bonding was being exerted on the butted faces, the entire machine parts were put into a furnace, in which the atmosphere could be controlled, having a high frequency induction heating coil, and the machine parts were all quickly heated to a transient liquid phase diffusion bonding temperature and maintained at the temperature for a period of time necessary for isothermal solidification of transient liquid phase diffusion bonding. After that, the entire machine parts were cooled to room temperature and finished to a final profile as shown in FIG. 5 or 6. The chemical composition of the bonding alloy, which was used in this embodiment, is shown on Table 2. The characteristic of the material used in this embodiment is shown on Table 3, together with the primary chemical composition. Concerning the profile of the piece of foil, with respect to the characteristic of a product obtained after the completion of bonding, there was no difference between a piece of foil, the profile of which was exactly the same as the profile of the bonding face, and a piece of foil, the profile of which was an arbitrary profile covering the bonding face, i.e. the profile of which was substantially rectangular or elliptical. In other words, the mechanical characteristic of the bonding section was exactly the same, as was the appearance after finishing.

TABLE 2

Composition of bonding alloy used for transient liquid phase diffusion bonding (atomic %)

| Mark | B | P | Si | V | Balance |
|---|---|---|---|---|---|
| Bonding metal 1 | 3.0 | | 1.0 | 4.5 | Ni |
| Bonding metal 2 | 4.5 | | 5.0 | 7.5 | Ni |
| Bonding metal 3 | 2.0 | 1.0 | 0.5 | 2.5 | Fe |
| Bonding metal 4 | | 4.0 | | 3.0 | Ni |
| Bonding metal 5 | 3.5 | | 2.0 | | Ni |

TABLE 3

Chemical composition (mass %) of material to be bonded and tensile characteristic (MPa)

| | C | Si | Mn | Cr | Mo | Ni | N | Tensile strength | Proof stress |
|---|---|---|---|---|---|---|---|---|---|
| Steel 1 | 0.12 | 0.1 | 0.8 | | | | 0.003 | 420 | 320 |
| Steel 2 | 0.14 | 0.2 | 0.5 | 1.0 | 0.5 | 0.2 | 0.005 | 480 | 360 |
| Steel 3 | 0.05 | 0.22 | 0.5 | 12.0 | | | 0.025 | 600 | 480 |
| Steel 4 | 0.02 | 0.25 | 0.5 | 18.2 | | 8.0 | 0.007 | 650 | 420 |

Concerning the thickness of a piece of foil for bonding, even when two or three pieces of foil, the thickness of which was 30 μm, were placed one on the other, the same characteristic was achieved. Concerning the temperature at which transient liquid phase diffusion bonding is realized, the most appropriate value is in relation to the melting point of foil. In the case of foil used in this experiment, the most appropriate value is considered to be in the range from melting point +50° to 150° C. It is possible to select a value from a range from 850 to 1400° C. corresponding to various types of foil, and it is necessary to heat to the temperature concerned. Further, the isothermal solidification process of transient liquid phase diffusion bonding is a special solidification phenomenon caused by rate-determining of diffusion of a common diffusion atom such as B or P, i.e. the isothermal solidification process of transient liquid phase diffusion bonding is a factor determined by the diffusion rate of B or P into the material to be bonded. However, the diffusion rate is changed greatly by the bonding temperature, and isothermal solidification is completed in a short period of time when the temperature is high. Accordingly, the period of time in which can be the parts are manufactured should be appropriately selected from a range from 850° to 1400° C. according to the melting points of the material to be joined and foil. In this case, the period of time was determined to be a value in the range from 10 seconds to 3600 seconds.

Concerning the machining conducted after the completion of assembling bonding, the amount of machining is determined by the difference between the final profile of the part and the profile of the part immediately after the completion of bonding. When the profile of the part immediately after the completion of bonding is essentially the same as the final profile, it is not necessary to conduct finishing. When the final profile coincides with the profile of the part immediately after the completion of bonding in the allowance of machining, it is also not necessary to conduct finishing. In the case shown in FIG. 5, the final part was obtained only by machining. However, in the case shown in FIG. 6, the final part was provided in such a manner that a disk, which had been separately prepared, was engaged with the part in which a screw had been formed. The machining or assembling conducted after the completion of bonding may be appropriately determined from the viewpoint of dividing the manufacturing process in view of the profile of the final product and also in view of reducing the manufacturing cost and simplifying the manufacturing process.

The part shown in FIG. 5 is a fluid injection nozzle having a pipe line inside. When the final product of the part was used as a machine part, the characteristics of the base metal and the bonding section of the final product of the part were essentially the same as those of a part having the same profile which was manufactured by means of forging and grinding. In other words, the same values were obtained with respect to the high temperature oxidizing characteristic (an increase in the thickness of oxidation scale per unit time on the external surface of the part), the corrosion resistance (hardness) and the mechanical strength of the bonding face for fluid pressure. The results are shown in Table 4.

TABLE 4

Result of evaluation of characteristic in using fluid injection nozzle

| | | Thickness of oxidation scale 300° C. × 1000 hours | Hardness Hv (1 kg) | Tensile strength (MPa) |
|---|---|---|---|---|
| Part of the present invention | Base metal section | 27 μm (External surface) | 224 | 474 |
| | Bonding section | 26 μm (External surface) | 231 | 481 |
| Conventional part | | 28 μm (External surface) | 227 | 477 |

Remark (1) Part of the present invention: A half part is subjected to press-forming and assembled by transient liquid phase diffusion bonding and finished so as to form a product.

Remark (2) Conventional part: A forged steel ingot is machined into a part having a predetermined profile, and further an internal pipe line is formed by precise drilling.

The part shown in FIG. 6 corresponds to a final outlet of a fluid conveyance pipe line, i.e. the part shown in FIG. 6 has functions as a faucet. When the part was made in the form of a half part, the surface roughness of the inner surface of the faucet, which was conventionally made by means of integral molding, was remarkably enhanced from Rmax=1 mm to Rmax=0.01 mm. Further, when the assembling bonding process was applied, the process cost could be reduced, and the manufacturing process time could be shortened by 30%. When the faucet made by the assembling bonding was applied to water-supply for trial, it functioned in the same manner as that of the conventional faucet manufactured by integral molding, and no leakage occurred. Since the internal face of the faucet was flat, no deposit adhered to the internal face and the quality of water was enhanced. In this connection, the transient liquid phase diffusion bonding conditions of the fluid injection nozzle and the faucet respectively shown in FIGS. 5 and 6 are shown in Table 5. As described before, these transient liquid phase diffusion bonding conditions can be appropriately selected according to the bonding foil and the material to be bonded, and also according to the characteristic necessary in the case of using the part.

TABLE 5

Example of condition of transient liquid phase diffusion bonding

| | Bonding temperature | Bonding stress | Holding time | $O_2$ concentration in bonding heating atmosphere |
|---|---|---|---|---|
| Fluid injection nozzle | 1150° C. | 3 MPa | 300 seconds | 18% |
| Faucet | 1250° C. | 12 MPa | 35 seconds | 0.03% |

EXAMPLE 2

Bonding alloy foil, the chemical composition of which is described in claims 4, 5 and 7, was selected to be the material for bonding in the form of foil, powder or plating. Steel, the chemical composition of which is shown in Table 2, was interposed between the bonding faces in the case of assembling the half machine part, the profile of which is shown in FIG. 7, so that a sufficiently appropriate profile and a sufficiently large area could be provided. The butted parts were quickly heated to a transient liquid phase diffusion bonding temperature: 900° C. or 1200° C. After that, the butted parts were held at the bonding temperature for 60 to 300 seconds and then cooled. In this way, the product was manufactured. After the completion of assembling bonding, an external surface was finished, as necessary. The part, the profile of which was formed into a final profile, was cut on a face perpendicular to the bonding face with respect to the internal pipe line, and the amount of contraction in the bonding stress loading direction was evaluated by a change in the pipe line diameter in the bonding stress loading direction. The surface roughness of the bonding face before conducting bonding and the defective bonding length after conducting bonding were measured so as to determine an influence of the bonding face machining accuracy. The results are shown in Table 6, together with the chemical composition of the material to be bonded.

TABLE 6

Manufacturing conditions of machine parts of method of the present invention and results of evaluation of bonding portions

| | Chemical composition of transient liquid phase diffusion bonding alloy | | | | | | | | | | Bonding stress | Amount of contraction | Surface roughness of bonding face before conducting | Ratio of defective bonding |
|---|---|---|---|---|---|---|---|---|---|---|---|---|---|---|
| Mark | C | Si | Mn | Cr | Mo | Nb | V | Ti | B | P | (MPa) | (%) | bonding Rmax (μm) | length (%) |
| 1 | 0.62 | 3.87 | 3.67 | | 4.86 | 0.02 | 4.50 | 2.04 | 11.67 | | 1.0 | 0.6 | 20 | 2 |
| 2 | 0.24 | 2.40 | 3.20 | 4.45 | | | 6.70 | 4.57 | 5.87 | | 25.3 | 3.8 | 25 | 2 |
| 3 | 0.61 | 1.46 | 1.27 | | 2.86 | 9.55 | 1.08 | | 3.93 | | 19.1 | 3.0 | 96 | 10 |
| 4 | | 4.41 | 4.40 | | 4.16 | 1.40 | | | 3.95 | | 10.4 | 2.0 | 67 | 7 |
| 5 | 0.50 | 0.16 | | | 0.19 | 1.10 | 7.52 | | 12.24 | | 18.1 | 2.7 | 62 | 6 |

TABLE 6-continued

Manufacturing conditions of machine parts of method of the present invention and results of evaluation of bonding portions

| Mark | Chemical composition of transient liquid phase diffusion bonding alloy | | | | | | | | | | Bonding stress (MPa) | Amount of contraction (%) | Surface roughness of bonding face before conducting bonding Rmax (μm) | Ratio of defective bonding length (%) |
|---|---|---|---|---|---|---|---|---|---|---|---|---|---|---|
| | C | Si | Mn | Cr | Mo | Nb | V | Ti | B | P | | | | |
| 6 | 0.84 | 0.83 | 2.22 | 7.53 | 0.72 | 4.92 | 1.14 | | 9.71 | | 20.4 | 3.0 | 53 | 5 |
| 7 | 0.64 | 2.17 | 4.81 | 12.54 | 3.14 | 3.23 | 1.97 | | 8.71 | | 4.4 | 1.2 | 68 | 7 |
| 8 | 0.82 | | 3.59 | 18.43 | | 1.65 | 8.87 | | 10.80 | | 22.2 | 3.4 | 13 | 1 |
| 9 | 0.49 | | 0.93 | | | 0.63 | 1.53 | | 14.73 | | 22.0 | 3.6 | 79 | 8 |
| 10 | 0.48 | | | | | 0.12 | 1.84 | | 12.64 | | 4.3 | 0.9 | 72 | 7 |
| 11 | 0.86 | | | | | 3.90 | 1.51 | 3.11 | 9.68 | | 2.6 | 0.5 | 55 | 6 |
| 12 | 0.83 | | | | | 0.32 | 1.91 | 4.23 | 5.42 | | 5.4 | 1.2 | 93 | 10 |
| 13 | 0.87 | 4.77 | 2.12 | | | 1.82 | 9.67 | 3.46 | 10.53 | | 27.7 | 4.5 | 24 | 2 |
| 14 | 0.13 | 0.27 | 2.61 | 16.25 | 2.89 | | 8.98 | | 9.01 | | 19.7 | 3.2 | 11 | 1 |
| 15 | | 1.89 | 3.97 | | 4.76 | | 9.02 | | 1.93 | | 5.1 | 1.3 | 92 | 10 |
| 16 | | 2.23 | 0.74 | | 3.41 | | 7.24 | | 13.84 | | 23.7 | 3.8 | 8 | 0 |
| 17 | | 2.06 | 3.83 | 4.91 | 4.82 | 3.81 | 8.20 | | 14.31 | | 5.1 | 0.9 | 9 | 0 |
| 18 | 0.14 | 1.31 | | | | 0.42 | 5.03 | | 14.06 | | 12.8 | 2.2 | 36 | 3 |
| 19 | 0.23 | 3.64 | | | | | 8.46 | | 14.51 | | 22.8 | 3.4 | 65 | 7 |
| 20 | 0.40 | 0.84 | 1.07 | 8.53 | 2.66 | | 6.45 | | | 5.71 | 4.9 | 1.0 | 92 | 10 |
| 21 | 0.17 | 4.49 | 3.57 | 19.57 | 0.91 | | 3.80 | | | 10.10 | 27.7 | 3.6 | 36 | 3 |
| 22 | | | | | | | 9.62 | | | 5.18 | 24.8 | 2.8 | 64 | 7 |
| 23 | 0.59 | 0.91 | 4.35 | | | | 9.75 | | | 2.82 | 21.9 | 4.4 | 39 | 4 |
| 24 | 0.74 | 2.01 | 4.15 | | | | 2.56 | 1.69 | | 12.21 | 16.7 | 0.9 | 41 | 4 |
| 25 | 0.13 | 2.59 | 2.57 | | | | 5.17 | | | 11.03 | 27.8 | 1.9 | 28 | 3 |
| 26 | | | | | | | 3.67 | | | 14.56 | 4.2 | 3.0 | 95 | 10 |
| 27 | | | | | | | 9.61 | | 10.45 | 12.83 | 9.8 | 1.1 | 90 | 9 |
| 28 | 0.29 | 3.77 | 3.73 | | | | 3.12 | | 5.38 | 7.96 | 19.8 | 0.4 | 20 | 2 |
| 29 | 0.74 | 0.53 | 0.96 | | | | 1.88 | | 13.76 | 4.19 | 5.7 | 0.4 | 98 | 10 |

As results shown in Table 5, the following were found. The characteristic of the bonding portion of the machine part, which was assembled and bonded by the method of the present invention, satisfactorily agrees with the performance of the use of the internal pipe line in the machine part. Therefore, the machine part, which was assembled and bonded by the method of the present invention, exhibits the same high performance as that of a machine part manufactured by the conventional method in which the machine part is manufactured by means of integral molding at high cost in a long manufacturing process.

FIG. 7 shows a result of evaluation of a machine part, the characteristic of which is partially inferior to the characteristic of the machine part manufactured by the prior art, in which integral molding is used, because this machine part was not manufactured according to the technique of the present invention, although the manufacturing method is similar to that of the present invention. However, even in this case, it is impossible to manufacture a pipe line, which is formed in the machine part shown in FIG. 7, by the prior art.

TABLE 7

Machine part manufacturing conditions by comparison method and results of evaluation of bonding portions

| Mark | Chemical composition of transient liquid phase diffusion bonding alloy | | | | | | | | | | Bonding stress (MPa) | Amount of contraction (%) | Surface roughness of bonding face before conducting bonding Rmax (μm) | Ratio of defective bonding length (%) |
|---|---|---|---|---|---|---|---|---|---|---|---|---|---|---|
| | C | Si | Mn | Cr | Mo | Nb | V | Ti | B | P | | | | |
| A | 12.5 | | 0.12 | | | 4.95 | 8.32 | | 5.05 | | 12.6 | 5.4 | 96 | 15 |
| B | | 0.80 | 0.99 | 4.37 | | 3.98 | 0.3 | | 12.46 | | 9.4 | 3.3 | 68 | 14 |
| C | 0.93 | 0.21 | | 13.07 | | 0.08 | 16 | | 14.17 | | 19.6 | 6.9 | 15 | 17 |
| D | 0.92 | 0.74 | | 25 | | 2.17 | 2.00 | | 13.85 | | 3.4 | 2.2 | 73 | 18 |
| E | 0.99 | 0.45 | | | 8.1 | 1.60 | 6.93 | 4.16 | 11.00 | | 11.2 | 4.9 | 69 | 21 |
| F | 0.52 | | 0.42 | | 2.54 | 7 | 5.17 | 0.28 | 9.46 | | 18.8 | 6.6 | 96 | 20 |
| G | 0.93 | | 0.58 | | 4.58 | | 6.58 | 9.1 | 8.21 | | 24.8 | 8.7 | 62 | 18 |
| H | 0.63 | 11 | 0.56 | 17.29 | 3.26 | | 4.29 | | 8.91 | | 24.7 | 9.6 | 78 | 14 |
| I | 0.49 | | 7.5 | 14.81 | 4.28 | | 8.45 | | 11.26 | 13.59 | 15.1 | 5.3 | 4 | 15 |
| J | 0.49 | | | 6.38 | 3.54 | | 2.19 | | 21.00 | 9.45 | 3.2 | 1.1 | 88 | 15 |
| K | 0.61 | | | 11.53 | | | 4.25 | | | 19.50 | 6.0 | 3.1 | 49 | 13 |
| L | 0.83 | | 0.15 | | | | 3.04 | | 7.05 | | 35.5 | 6.6 | 150 | 16 |
| M | | | 0.51 | | | | 2.21 | | 11.77 | | 41 | 9.2 | 85 | 10 |

In the manufacturing conditions of machine parts A to M and the results of evaluation of the bonding portions conducted by the comparison method shown in Table 7, and machine parts A to M are described as follows. In the case of machine part A, C (carbon) was high in the composition of the bonding alloy, and the bonding metal was embrittled and coagulation cracks were caused in the process of isothermal solidification in the transient liquid phase diffusion bonding. As a result, the ratio of the defective bonding portion length exceeded the threshold value. In the case of machine part B, the quantity of V added to the bonding metal was insufficient, so that a large quantity of oxide remained in the bonding metal. As a result, the ratio of the defective bonding portion length exceeded the threshold value. In the case of machine part C, the quantity of V added to the bonding metal was too much, and a large quantity of V oxide remained in the bonding metal. As a result, the ratio of the defective bonding portion length exceeded the threshold value. In the case of machine part D, the quantity of Cr added to the bonding metal exceeded 20 atomic %. Therefore, the bonding metal was not amorphous, and a remarkable segregation was caused and boride of Cr was created in the alloy. As a result, it was impossible to execute a transient liquid phase diffusion bonding, and the ratio of the defective bonding portion length exceeded the threshold value. In the case of machine part E, the quantity of Mo was excessively large, and a large quantity of intermetallic compound containing Mo was created in the bonding metal, and the ratio of the defective bonding portion length exceeded the threshold value. In the case of machine part F, the quantity of Nb was excessively large. Therefore, grains of carbide and nitride, the size of which was coarsened, were deposited on the final solidification position of isothermal solidification, and the ratio of the defective bonding portion length exceeded the threshold value. In the case of machine part G, the quantity of Ti was excessively large. Therefore, grains of carbide and nitride, the size of which was coarsened, were deposited on the final solidification position of isothermal solidification, and the ratio of the defective bonding portion length exceeded the threshold value. In the case of machine part H, the quantity of Si was excessively large. Therefore, a large quantity of Si oxide remained in the bonding metals. As a result, the ratio of the detective bonding portion length exceeded the threshold value. In the case of machine part I, the quantity of Mn in the bonding metal was excessively large. Therefore, the mechanical strength of the bonding metal was increased to too high a level and the bonding metal was embrittled, and cracks were caused in the process of solidification, and the ratio of the defective bonding portion length exceeded the threshold value. In the case of machine part J, the concentration of B (boron) was high, and it was possible to conduct the transient liquid phase diffusion bonding. However, a large quantity of boride remained in the bonding metal. Therefore, the ratio of the defective bonding portion length exceeded the threshold value. In the case of machine part K, a large quantity of P was contained and left in the bonding metal. Therefore, the ratio of the defective bonding portion length exceeded the threshold value. In the case of machine part L, the bonding face machining accuracy before conducting bonding was low, i.e. the surface roughness of the bonding face was high. Therefore, when a high stress was exerted, the amount of contraction in the bonding stress loading direction exceeded 5%. At the same time, the ratio of the defective bonding portion length exceeded the threshold value 12. Therefore, it was impossible for this machine part to satisfy the required performance. In the case of machine part M, when a high stress was exerted, the amount of contraction in the bonding stress loading direction exceeded 5%. Therefore, it was impossible for this machine part to satisfy the performance required of it.

Industrial Possibility

The present invention provides a method of effectively manufacturing a precision machine part at low manufacturing cost by applying a process in which split parts capable of being simply manufactured are adhered to each other by a bonding technique of transient liquid phase diffusion bonding or face bonding instead of a conventional method of manufacturing a precision machine part having a complicated and precise pipe line inside by means of integral molding.

What is claimed is:

1. A precision machine part having a longitudinal axis and a plurality of discrete conveyance passages formed therethrough and comprising a plurality of pieces bonded along faces of said pieces extending along the longitudinal axis of said precision machine part with a transient liquid phase diffusion bonding alloy provided between said pieces to bond said pieces together so as to form said conveyance passages, the precision machine part being configured to permit passage of liquid or gas through said conveyance passages from a pipe line or cylinder, wherein the bonding alloy contains 1 to 15 atomic % of B or P or a mixture of B and P and 1 to 10 atomic % V, the balance being Fe and unavoidable impurities based on the bonding alloy, and wherein the bonding alloy exhibits an amount of contraction in a bonding stress loading direction caused by plastic deformation in the bonding process of not more than 5%.

2. The precision machine part of claim 1, wherein the bonding alloy further comprises one or more components selected from the group consisting of 0.1 to 10.0 atomic % C, 0.1 to 5.0 atomic % Si, 0.5 to 5.0 atomic % Mn, 0.1 to 20.0 atomic % Cr, 0.1 to 5.0 atomic % Mo, 0.01 to 5.0 atomic % Nb and 0.01 to 5.0 atomic % Ti based on the bonding alloy.

* * * * *